United States Patent [19]
Talati

[11] Patent Number: 5,999,942
[45] Date of Patent: *Dec. 7, 1999

[54] METHOD AND APPARATUS FOR ENFORCEMENT OF BEHAVIOR OF APPLICATION PROCESSING SYSTEMS WITHOUT MODIFYING APPLICATION PROCESSING SYSTEMS

[75] Inventor: Kirit K. Talati, Sunnyvale, Tex.

[73] Assignee: Appage Corporation, Dallas, Tex.

[*] Notice: This patent is subject to a terminal disclaimer.

[21] Appl. No.: 08/896,972

[22] Filed: Jul. 18, 1997

Related U.S. Application Data

[63] Continuation-in-part of application No. 08/419,912, Apr. 11, 1995, Pat. No. 5,677,997, which is a continuation-in-part of application No. 08/370,510, Jan. 9, 1995, abandoned, which is a continuation-in-part of application No. 08/016,430, Feb. 11, 1993, Pat. No. 5,390,330.

[51] Int. Cl.$^6$ .......................... G06F 17/30; G06F 15/163
[52] U.S. Cl. .................................. 707/104; 709/303
[58] Field of Search .............................. 707/104; 395/683, 395/702–703; 709/303

[56] References Cited

U.S. PATENT DOCUMENTS

| | | | |
|---|---|---|---|
| 5,341,478 | 8/1994 | Travis, Jr. et al. | 709/203 |
| 5,390,330 | 2/1995 | Talati | 395/703 |
| 5,548,756 | 8/1996 | Tantry et al. | 707/10 |
| 5,551,030 | 8/1996 | Linden et al. | 707/102 |
| 5,677,997 | 10/1997 | Talatik | 706/45 |
| 5,760,773 | 6/1998 | Berman et al. | 345/347 |
| 5,764,958 | 6/1998 | Coksun | 395/500 |
| 5,768,418 | 6/1998 | Berman et al. | 395/683 |
| 5,805,869 | 9/1998 | Smith et al. | 395/683 |
| 5,818,447 | 10/1998 | Wolf et al. | 345/335 |
| 5,873,094 | 2/1999 | Talatik | 707/104 |

*Primary Examiner*—Zarni Maung
*Assistant Examiner*—Andrew Caldwell
*Attorney, Agent, or Firm*—Jenkens & Gilchrist, P.C.

[57] ABSTRACT

A method and apparatus for changing the behavior of a target application processing system is disclosed. The target application processing systems includes at least one information model including one or more actions defining a process flow having an expected behavior. A second database defines a plurality of other actions wherein each of the actions has a selected behavior associated with the action. Upon selection of one of the actions from the second database, execution of the selected action produces a behavior associated with the action to change the process flow of the target application processing system in accordance with a newly defined behavior.

31 Claims, 6 Drawing Sheets

METHOD AND APPARATUS FOR ENFORCEMENT OF BEHAVIOR OF APPLICATION PROCESSING SYSTEMS WITHOUT MODIFYING APPLICATION PROCESSING SYSTEMS

RELATED APPLICATIONS

This application is a Continuation-in-Part of U.S. application Ser. No. 08/419,912 filed on Apr. 11, 1995, U.S. Pat. No. 5,677,997 which is a Continuation-in-Part of U.S. application Ser. No. 08/370,510, filed on Jan. 9, 1995, now abandoned, which is a Continuation-in-Part of U.S. application Ser. No. 08/016,430, filed on Feb. 11, 1993, U.S. Pat. No. 5,390,330.

BACKGROUND OF THE INVENTION

1. Technical Field of the Invention

The present invention relates in general to application processing control system, and more particularly, to methods of controlling the behavior of one or more target applications processing systems without modifying the target application processing systems.

2. Description of Related Art

Information processing systems today consist of application processing systems for each type of information and require complex sets of programs to process information. Typical examples of such application processing systems include Internet browsers for browsing the Internet, HTML (HyperText Management Language) Editors for creating Internet WEB Pages, word processors, GroupWare for office documents, transaction processing applications for accessing and processing business mission-critical transactions, decision support tools to collect and analyze historical data to make decisions, etc.

Technological advances in hardware such as hand held devices, however, are still limited in executing application programs due to very small memory area and lack of storage devices associated with these devices. As a result, users of such systems have to write or purchase separate pocket-size application processing systems which are unable to provide the performance available on desktop computer systems. There is therefore a need for a universal information appliance system that can run, with all its functionalities and without modification, on most kinds of information systems, including hand-held devices, and that is simple to use in creating and executing applications without requiring any external programming tools.

SUMMARY OF INVENTION

The present invention overcomes the foregoing and other problems with a method and apparatus for controlling the behavior of various kinds of application processing. An expected behavior control system ("EBCS") is integrated with an application processing control system including at least one application program having actions defined therein. With respect to the EBCS, the terms, "action", "rules", "expression", "control directives", "directives", "constraints", "functions", "Information directive", are considered as synonymous for various information directive unless otherwise specified. The EBCS includes an expected behavior function for detecting whether an executed action by the control program produces an expected behavior or result. Additionally, the EBCS may conform or enforce selected action behavior or results without modifying the application processing system. When an expected behavior is achieved, the application processing system executes the next action defined by the application program. If an unexpected behavior is detected, a correction action function executes at least one corrective action in order to conform or enforce the behavior of the application processing system to an expected behavior or result.

A primary object of the invention is to create an Application Processing Control System (APCS) that allows the user to execute one or more target application programs using a single target application program (e.g., Word Processor) acting in conjunction with the EBCS, without any modification to the single target application processing program. This is achieved using control directives (rules, actions, etc.) independent of the target application programs, thus eliminating the need for requiring multiple target application programs. This is an improvement over existing technologies that can execute one more target applications such as browser, word processor etc. but require individual traditional sequential programs for each target application. The invention significantly improves the performance and reduces the size of the APCS by eliminating one or more target applications. An example is browsing the Internet and creating Browser WEB Pages on the Internet using only a Word Processor application rather than an Internet Browser application and a WEB Page Editor application. This is possible using a plurality of control directives of document access associated with the word processor application but stored in a separate database associated with the EBCS. This eliminates the need for creating and maintaining two additional target applications.

Another objective of the invention is to create an Application Processing Control System (APCS) that allows the user to execute one or more target applications using a single target application in real time, without any modification to the single target application using information directives that are independent of the target applications. For example one can build an information model for a browser to display and navigate HTML documents using, for example, a Microsoft Internet Browser via Common Object Model (COM) interface and enforce new behaviors or actions that are responsive to existing actions defined by the information model to filter viruses or restrict documents containing offensive material by modifying activation actions within the EBCS without modifying Microsoft's Internet Browser.

A further object of the invention is to use natural language-like input to access and process information in real time by changing information processing of the target application without modifying the information model of the target application.

A further object of the invention is to extend the continuous monitoring of the expected behavior of actions by the control system engine (CSE) to minimize the impact of changing data or changing actions on the information processing systems.

The foregoing has outlined some of the pertinent objects of the present invention. These objects should be construed to be merely illustrative of some of the more prominent features and applications of the invention. Many other beneficial results can be attained by applying the disclosed invention in different manners or modifying the invention as may be desired. Other objects and a further understanding of the invention is described in the following detailed description of the preferred embodiment.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
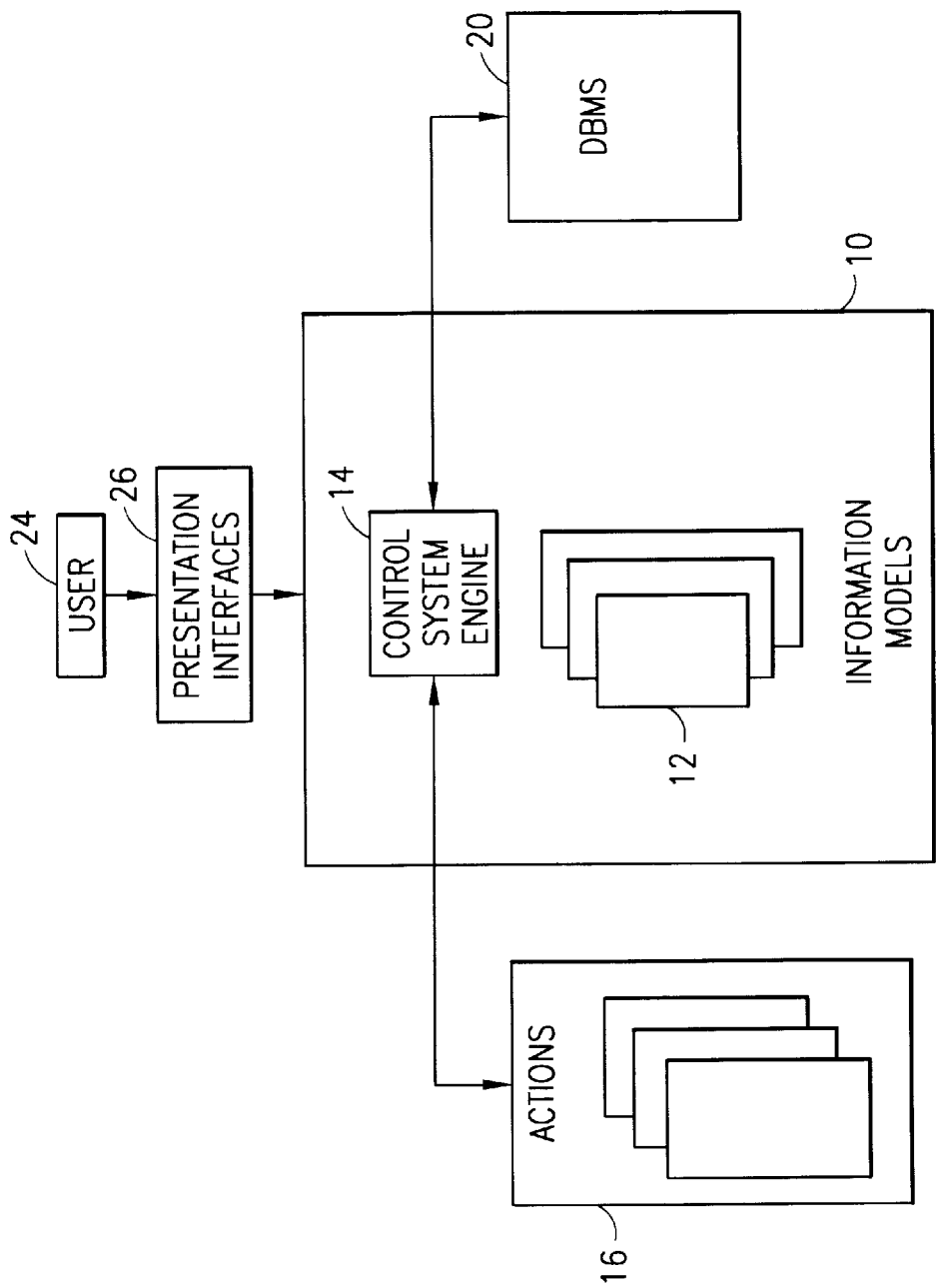
FIG. 1 illustrates an information processing system environment containing a Control System Engine and Information Models.

Referring now to FIG. 1, a block diagram of an embodiment of a model information control system (MICS) 10 of the present invention is shown. The MICS 10 includes at least one information model 12 which is created using a text editor and specific semantic rules defined for a target computer system upon which the MICS executes. Several information models are shown in detail below. The target computer system typically comprises any information processing system such as a PC or workstation/server computer running a Windows, UNIX, DOS or OS/2 operating system or the like, although other target systems are useful as well. The MICS 10 also includes a control system engine (CSE) 14 which is preferably a finite state control action machine that cycles through states of operation as will be described in more detail below. The control system engine 14 performs several actions. It activates an object from a set of objects defined in the information model 12. The control system engine 14 also activates an action from a set of actions 16 associated with the object. These actions may be defined in the information models 10 or in a separate database as shown in FIG. 1. This is achieved using an associated action flag as will be described.

Figure 2:
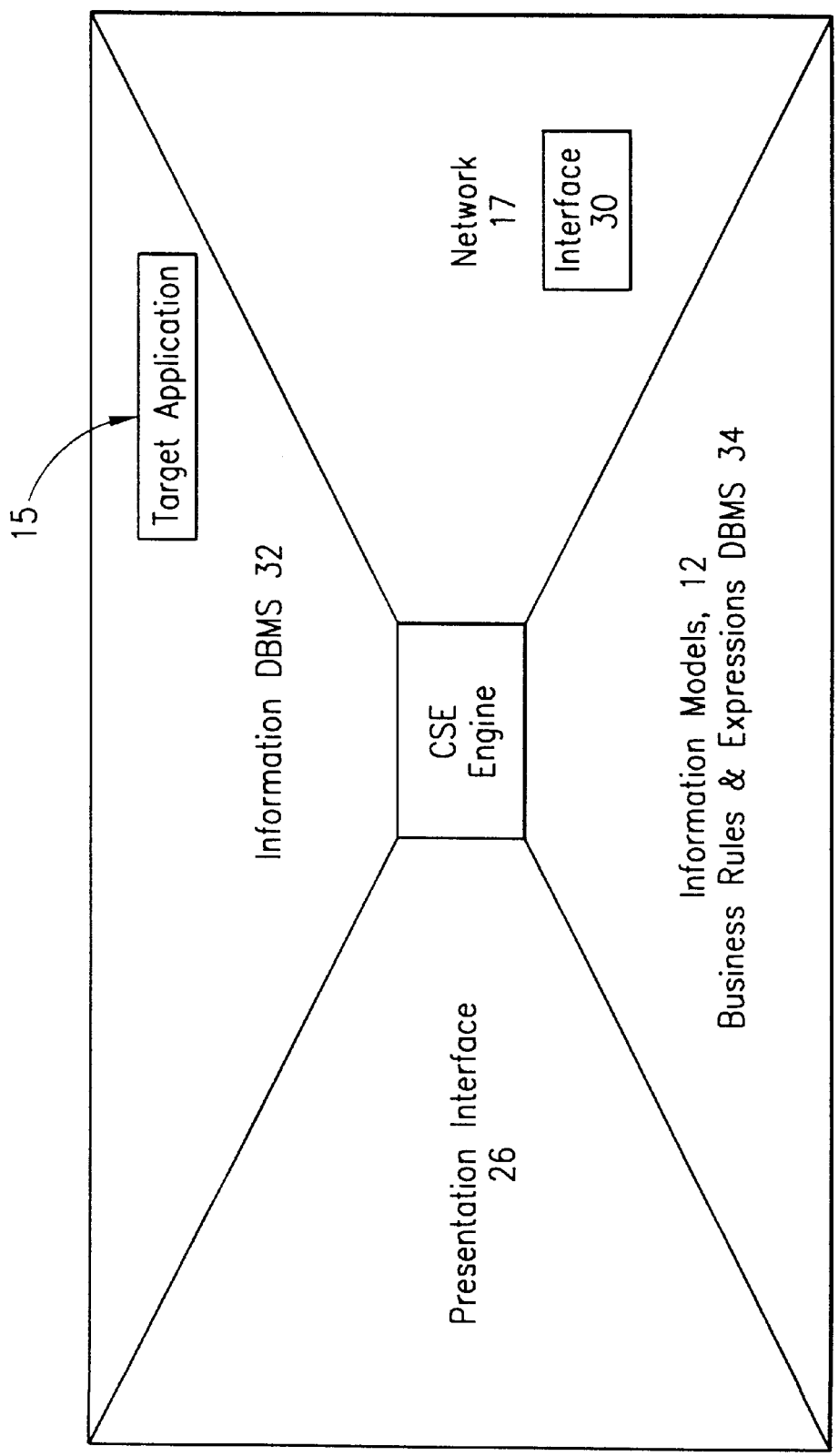
FIG. 2 illustrates a set of typical information processing systems within an application processing control system used in the present invention.

Referring now also to FIG. 2, a diagram is shown of an Application Processing Control System 13 (APCS) where the control system engine (CSE) 14 has the expanded capacity to control a number of target applications 15 from a number of sources such as a network 17, information database management systems 32, and rules and expression applications 34, including information models 12. The target applications 15 are accessed through a user interface 17 or network interface 30.

The manner of control of the target applications 15 is similar to the control of a MICS. The control system engine 14 selects and activates "instants" of the information model 12 and processes each instant through a function set associated with the select instant. An "instant" of an information model 12 refers to a given condition or state of the values of the attributes or a Dataset defining a set of attributes. An attribute is a particular variable or information item associated with an object. In the present document, dataset and object are interchangeably used and means the same thing unless and otherwise specified. An "active" instant of an object exists where the object's attributes have values assigned or instanciated previously by retrieving the values from the database. An "empty" instant is a condition where the values of the object's attributes have yet to be assigned or instanciated. Data used by the control system engine 14 is stored in a database (DB) 20 and the engine interacts with the DB 20 through a database interface 22. The user 24 of the MICS interfaces to the rest of the system through a presentation interface 26. It should be noted that one or more functions and/or the database 20 may be accessed locally or remotely.

An information model 12 consists of at least one attribute and one control flag or at least one object and one action. The object generally will include a set of attributes that constitutes a "set" of the attributes of the object or data set, a number of control flags, and one or more information directives. The control flags, in conjunction with the expressions, facilitate the CSE's use of the object. Preferably, control flags are divided into four distinct types, namely (1) attribute type flags, (2) object type flags [that control storage and retrieval of the object's instant(s)], (3) action type flags [that facilitate activation and processing of instant(s) through one or more functions], and (4) function control flags used with attributes to provide control of attributes specific to the function, [e.g., presentation function control flags that can be passed to a user interface function to control the presentation and/or interactions between the user interface function and the various I/O devices of the system (such as the presentation display and report printer)].

The attribute type control flags specify how to control the behavior of the attributes such as "storage" classes and "existence" classes. The "storage" classes flags identifies the storage values such as "picture", "video", "voice", "real," "integer," "scientific," "Boolean," "ASCII," "data," "time" and the like. The attribute "existence" classes of flags control the rules for creating attributes. For example, ATYPE and "select" attribute constraint expressions specify the conditions for creating one or more attributes. For example the attribute "09:00 A.M." in the Appointment Calendar Information Model has the control flag "TYPE=T" which specifies the attribute name is of type time, and the attribute "select" constraint defines how to create another attribute which is explained in detail later.

The object type control flags include "primitive," "transient," "atomic," "view," "synonym," "link," "table" and "group." This list is exemplary and other object type flags can be defined and used to categorize and associate one object with one or more other objects. A primitive object type flag indicates that the object's instant(s) are to remain in the MICS in the system for some time. A transient object type flag indicates that the object's instants need only be retained in the system for the duration of processing of particular actions. An atomic object type flag means that the object's instant is derived by abstraction from some other (primitive) instant of the object. An instant identified by a transient object type flag is also retained in the system. A view object type flag indicates that the primary object is a view of some other object. A "synonym" object type flag follows an identification of a primary object and indicates that the attributes of the primary object should be substituted with the attributes of the object identified in a "using of" flag. Thus, if an object A is followed by the flag "using of X," the attributes of object X would be used by object A.

A "group" object type control flag indicates that a set of instants must be processed in a group by a selected action. Each object may also have an associated link object. For example, if object A is an atomic view of a primitive object B, then object B is said to be the associated link object of object A. Or, if the instant of object C can exist if and only if there is a corresponding instant of another object D, then object D is said to be an associated link object of object C.

As noted above, the action type flags in the object identify the action which facilitates activation and processing of instant(s) by the CSE. An action consists of four control flags, namely "action identifier," "instant type," "action class," "instant propagation type," and optionally one or more "function." An action identifier flag is the flag by which the particular action is known external to the system. The instant type flag indicates the type of instant (active or empty). The action class flag identifies the class of actions to which the particular action belongs. An instant propagation type flag indicates how to propagate the change of instant for a primitive or atomic object of the instant. The functions if defined may be required to be executed to process the instant.

As noted above, when the object is defined in the information model, it will typically include presentation control function flags that control presentation of the object's attributes by external interfaces. In particular, each attribute therein may include one or more of the presentation control flags which can be passed to the user interface function to control the presentation and/or interactions between the user interface function and the various I/O devices of the system (such as the presentation display and report printer). Representative sample of presentation control flags are FPROT, MFILL, RJUST, FHIDE, DPROT, RSKIP, CENTER, GROUP, COMMON, UNIQUE, WSKIP and PHIDE. An FPROT presentation control flag provides a field protection action that prevents the user from instantiating the particular attribute of the object. An MFILL flag indicates that the attribute is one that the user must instantiate. The RJUST, LJUST, or CENTER flags inform the presentation interface to right justify, left justify, or center the value of the attribute on the presentation display. An FHIDE flag prevents the value of the attribute from being displayed. A DPROT flag protects the value of the attribute overwritten to DPROT from being erased. A COMMON flag indicates that the attribute is shared by multiple users and may require a specific action for active instants before execution of any propagation expression. A UNIQUE flag indicates that instances of the object are organized by the value of the attribute and indicates that to create the index attribute of the object is to be created. An RSKIP flag tells the presentation interface to skip the attribute when a report is printed, and a WSKIP flag tells the interface to skip the attribute when a window is created on the display. PHIDE flag hides the name of the attribute. GROUP flag indicates that the interface should organize values of attributes for a display so it is easy to read.

According to a feature of the invention, attributes (or objects) in the information model use consistent rules or "expressions" that, in conjunction with the various control flags, facilitate the application process flow to execute the information model. The attributes (of an object) contain (i) information on how to assign values to these attributes, (ii) value constraints limiting the kind of values that can be assigned to these attributes, (iii) dependency information specifying how assigning a particular value to one attribute affects the value of another attribute, and (iv) select constraints creating one or more attributes with specific constraints. More specifically, at the attribute level the rules (or expressions) include (i) "initial values" or "default values" expressions that assign values to these attributes, (ii) "values," "condition" or "assignment" expressions limiting the kind of values that can be assigned to these attributes, (iii) "activation" expressions specifying how to change the value of attributes when instances are activated, (iv) "propagation" expressions specifying how assigning a particular value to one attribute affects the value of another attribute, and (v) "select" expressions specifying constraints limiting the kind of instants that can be activated.

Similar rules or expressions are implemented at the object level. When used in an object, these expressions modify the behavior of an instant of the object to effect the activation, instantiation and processing of the information. For example, a constraint expression at the object level specifies the activation constraint limiting what kind of instants of the object can be activated. Finally, the object also includes index attributes by which instances of an object can be stored and retrieved via the database using the value of one or more attributes of the object.

Thus according to the invention, an object generally includes one or more control flags that facilitate the CSE's use of the object, group of attributes as a single data set, and one or more information directives consisting of rules or expressions that modify the behavior of an object's instants to affect the activation, instantiation and processing of information. An object's attributes may also include expressions that control how values to these attributes can be assigned, that limit the kind of values that can be assigned to these attributes, that specify how to change the value of attributes when instants are activated, that specify how assigning a particular value to one attribute affects the value of another attribute, and that specify constraints limiting the kind of instants that can be activated.

An advantageous feature of the present invention is that the APCS 13 automates the application processing of a target application 15 with autonomous control by directly converting one or more information models 12 into an independent set of activation, instantiation and processing of functions using control flags defined in the model. In the prior art, it has heretofore been necessary to create a detailed design of such process flow (and to automatically or manually generate source code to implement the flow) or to separately activate another target application 15. The present invention wholly obviates such detailed design and code generation.

Figure 3:
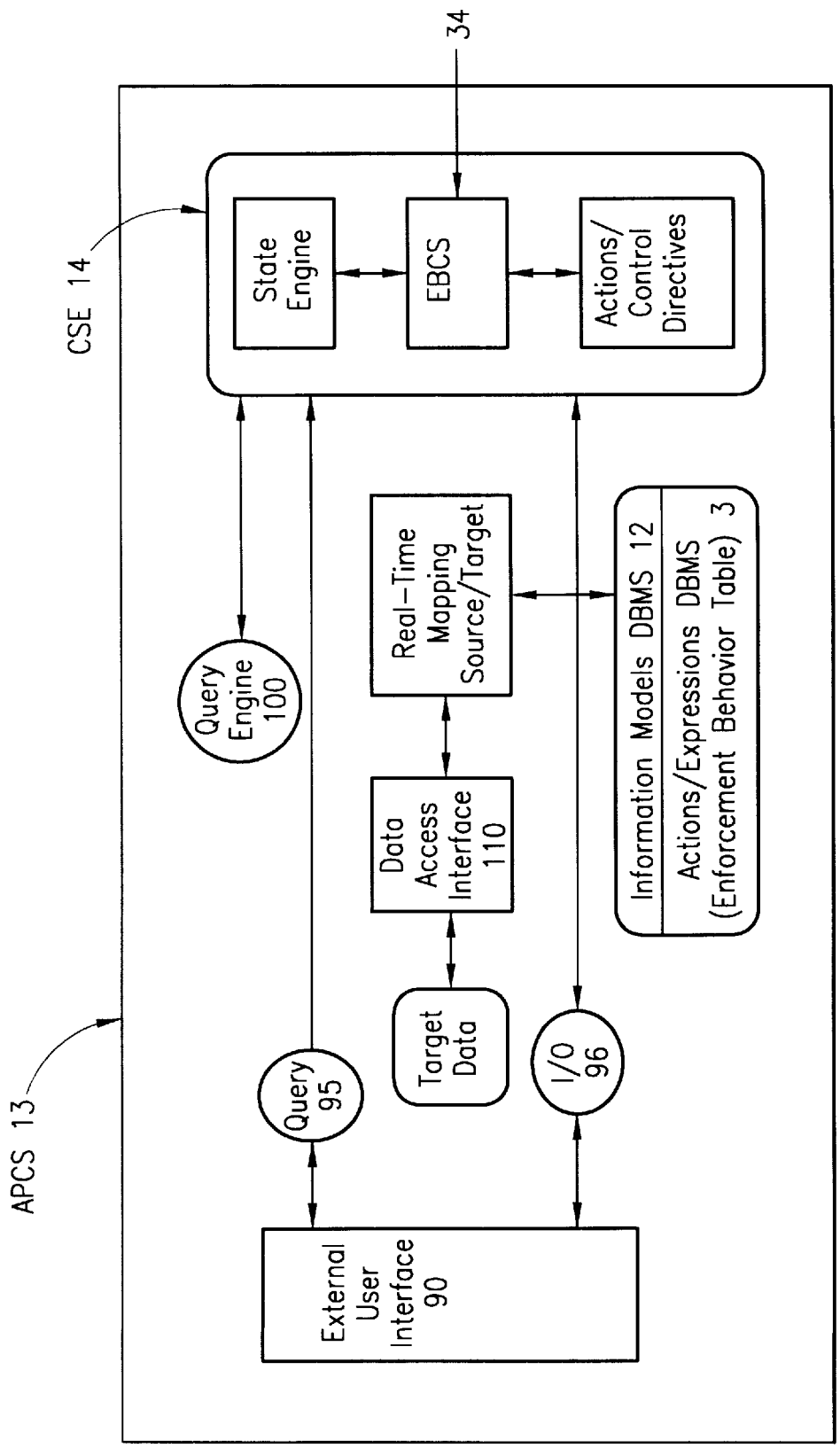
FIG. 3 illustrates an application processing control system.

According to the preferred embodiment of the invention and referring to FIG. 3, the APCS 13 includes a query engine 100, user interface 90, data access interface 110, one or more information models 12, a defined actions database 3, and the control system engine 14 (CSE). The control system engine 14 reads the information model 12 directly and in response thereto (i) activates objects from the set of objects defined in the information model, (ii) activates actions from a set of actions associated with action control flags of an object, (iii) activates one or more "instants" of an object and (iv) processes the one or more instants of the object through one or more interfaces or functions associated with the actions along with any expressions associated with the object and/or its attributes. The APCS 13 activates and processes an independent set of activation, instantiation and service actions associated with the EBCS over the information models 12, that can be themselves aspects of target applications.

A specific implementation of the APCS 13 incorporating the features of the present invention can now be described. By way of additional background, it is helpful to define the concept of an "action" which refers to the automatic categorization and association of functions using control flags to control activation, instantiation and processing of information using one or more functions. This obviates the specific creation of process flow instructions for each application. Applications thus can be said to be isolated from the process flow specification process because the information model only needs to specify an action and not how the action is implemented. An "action" is preferably categorized by its class of service or type of function that it uses. For convenience, action class types are divided as follows:

1) ANALYSIS type (actions that process an active instants through one or more functions that analyze information);
2) DATABASE type (actions that process an active instant through one or more functions that access and manipulate information);
3) REPORT type (actions that process an active instant through one or more functions that create reports from information);
4) ADD type (actions that process an empty instant through one or more functions to create an active instant);
5) UPDATE type (actions that process an active instant through one or more functions that access, manipulate and return an active instant to the database);
6) DELETE type (actions that process an active instant through one or more functions that remove the trace of an instant from the database); and
7) CREATE type (actions that process an active instant through one or more functions to create atomic information from primitive information).

The above list of action types is merely exemplary and the APCS 13 may include other action types or variations of the above. Each action has associated therewith the set of action control flags previously described. It should be noted that different sets of action control flags can be used instead of the flags identified above.

In an exemplary embodiment of the invention, assume that the action type is UPDATE. The associated action control flags are then: "UPDATE, ACTIVE INSTANT, DATABASE, UPDATE INSTANT, USR_INSTANTIATION." The first flag UPDATE is the identifier flag that identifies the action UPDATE. The second flag ACTIVE INSTANT indicates that the action requires an active instant. The third flag DATABASE identifies that the UPDATE action belongs to the DATABASE action class type. The fourth flag, UPDATE INSTANT, is the instant propagation type that will cause the CSE to update the final state of the active instant using the database interface. Finally, the function USR_INSTANTIATION indicates that the CSE will require the execution of a user instantiation function. The user instantiation function instantiates an instant through the user interface 17.

In another example, assume the action is ADD. The ADD action has action control flags "ADD, EMPTY INSTANT, DATABASE, UPDATE INSTANT, USR-INSTANTIATION," The first flag identifies the action ADD. The second flag indicates that the action operates on an empty instant. The third flag identifies that the ADD action belongs to the DATABASE action class type. The fourth flag, UPDATE INSTANT, is the instant propagation type flag and will cause the CSE to add a newly created instant to the database using the database interface. Finally, the function USR-INSTANTIATION indicates that CSE will require execution of a user instantiation function.

Each information model has one of three states: idle, active and suspended. When an information model is in its idle state, its "next state" is active. An information model in the active state can be suspended at any time during the processing of the information model. Once suspended, the information model can be returned to its active state (at the same point therein where processing was suspended) or the suspended information model can be placed back into its idle state. Each information model has associated therewith an attribute identifying its state and its next state.

Figure 4:
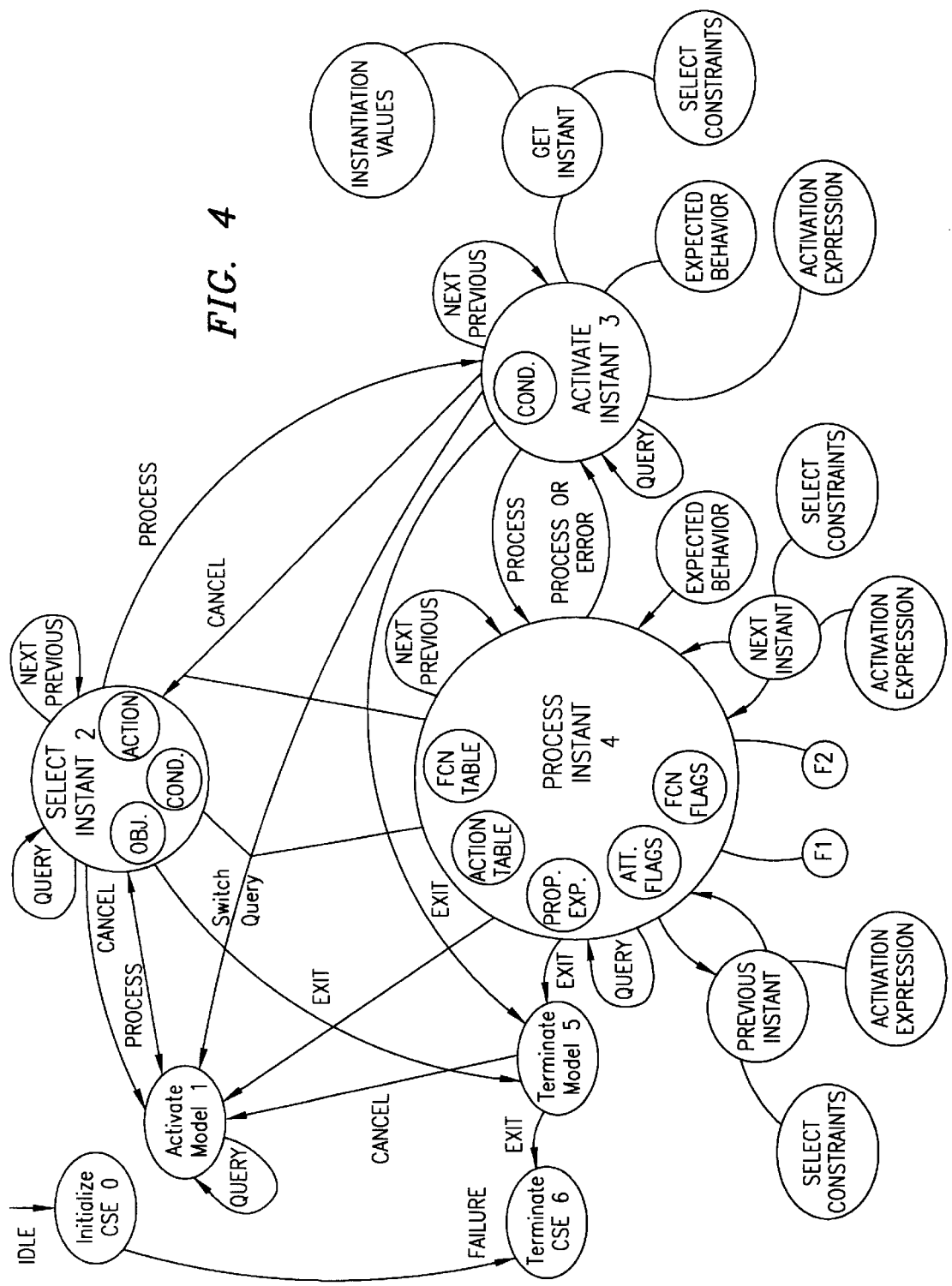
FIG. 4 illustrates the process flow of the Control System Engine contained in FIG. 3.

Referring now to FIG. 4, a detailed state diagram is shown of the preferred operation of the control system engine (CSE) of the APCS. The various states of the CSE and associated control actions are identified below:

(1) Initialize CSE
(2) Activate Model
(3) Select Instant
(4) Activate Instant
(5) Process Instant
(6) Terminate Instant
(7) Terminate CSE Prior to the CSE execution, one or more information models are created by a developer using semantic rules for the target system. Execution of the control system engine begins with State 0, where the CSE is initialized. This step obtains the necessary resources (e.g., memory, buffer pools, interprocess communication, I/O interface) from the operating system and then reads the action table definitions and function table definitions and loads them into memory. The CSE also creates structure in the memory to hold the information model. State 0 also sets up the user environment's presentation interface 26 as shown in FIG. 1. In State 0, all information models are set to idle and the information model attribute is set to "1" (which is the next state after selection of an idle model). The CSE then moves to State 1. If there is a failure during State 0, the CSE goes to State 6 and terminates, providing an error message or the like.

In State 1, if state 1 is a result of a CANCEL event then CSE proceeds to State 5. If state 1 is a result of query 95, CSE uses query engine 100 to modify the behavior of the information model by changing one or more actions of the information model with actions provided in the query 95. If there is no select instant provided in terms of query then user is prompted to select an instant. Although not meant to be limiting, preferably the presentation interface is a Windows-based graphical user interface (GUI) and a conventional point and click device is used to make appropriate selections. Touch screen, handwriting and voice can also serve as presentation interfaces. If the user selects an instant via GUI, the CSE activates object and/or attributes, associated functions and select condition directives to activate an instant if one is given. If user has only given the application name, the CSE obtains all necessary components of select instant from the user via a GUI interface. If the selected instant is an active instant then CSE continues with the current "active instant". The activation of an instant means assigning necessary storage area, initializing databases, creating an object from sets of attributes with associated attributes and information directives or merely building a group of attributes with associated attribute constraint expression. This will be more fully shown later with respect to a calendar example.

If the user decides to cancel the session, the CSE activates the most recently suspended instant to "active instant." The CSE then proceeds to the next state of the active model. If the user decides to exit, the CSE proceeds to State 5 and the CSE is terminated.

In State 2, if no object is selected then the CSE first determines whether there are one or more objects defined for the active model. If there is no object, set the object equal to the model name and copy all control flags and control expressions defined for the model to object, and set all attributes of model as attributes of object. If there is only one object defined for the active model, the CSE sets "active object" attribute to this object.

On the active model, the CSE first checks if there is any execution via query. If none, then, it controls the presentation interface to display the list of available objects (which are defined in the information model) and prompts the user to select one. If the user selects one of the objects, the CSE sets an "active object" attribute to the selected object. If the user decides to cancel, the CSE then proceeds to State 5 in which the active model is terminated. In State 2, if no action is selected then the CSE first determines whether there is an action class flag associated with the active object. If there is one, the CSE substitutes all action flags associated with the action's class as valid action flags. If there is only one action flag, the CSE sets an action associated with the action flag to "active action". On the other hand, if there is more than one action flag, the CSE controls the presentation interface to display the list of action names associated with action flags of the active objects and prompts the user to select one. If the user selects one of the actions, the CSE sets an "active action" attribute to the action associated with the action name of the selected action of the active object. If the user decides to cancel, the CSE proceeds to State 5. If the user decides, however, to access another information model during State 2, the CSE sets the active model's next state equal to 2, suspends the active model and proceeds back to State 2.

In State 3, processing begins by first setting all values of the attributes of active objects to zero except those attributes having the DPROT flag set. Then a test is performed to determine whether the active object has an associated link object. If so, the CSE activates the instant of the link object. If activation for a link object fails, the CSE returns to state 2. If the activation for the link object has been successful, or if the active object does not have an associated link object, then the routine continues by determining whether the active object requires an active instant. If so, the CSE then activates the instant using a select condition if one exists in the active object. (The select activation constraint of the object maps directly to a select call associated with the database 20). If activation fails, and there is no learn flag, the CSE goes to state 2. If activation is successful or no activation is required, the CSE goes to State 4. If activation fails and there is a learn flag, the CSE also goes to state 6 because the learn flag instructs the CSE to accept an empty instant even though an active instant might otherwise be required. For example, in an appointment calendar information model, the database will not necessarily contain the instances corresponding to all calendar dates. When the user makes a request to see the data for a specific page of the calendar and no data for this page exists in the database, the learn flag allows the CSE to accept the empty page as an active page with no data in it so that when the user enters the data on this page it will be entered into the database. Also, the CSE executes any activation expression if one exists for the active instant. If the user decides, however, to access another information model during State 3, the CSE sets the active model's next state equal to 3, suspends the active model and proceeds back to state 1. For each of the actions described above, such as activation of instants, assigning of values and execution of expressions a check is performed by an Expected Behavior Control System (EBCS) to determine if the execution of the actions provide an expected behavior. For conformance of actions to a particular behavior, the checks are performed only after an action is performed. For enforcing particular behavior, one or more actions may be substituted or the checks may be performed both before and after the processing of actions by the EBCS.

In State 4, the CSE first determines if there is any function flag associated with the active action. If one or more function flags exist, then for each function flag, the CSE executes the associated function and any propagation expression associated with the active object over all instants which satisfy activation constraints in the object.

The function may be an instantiation function, e.g., a user instantiation function that interacts with the user using the presentation interface and presentation control flags. The CSE also processes any attribute flags by mapping the attribute flags into appropriate functions. For example, the presentation flags are used to create windows and control the interaction with the data in the window. Only data that satisfies attribute constraints is accepted and upon acceptance, the CSE also executes any propagation expression associated with any attribute. If the user decides, however, to access another information model during State 4, the CSE sets the active model's next state equal to 4, suspends the active model and proceeds back to State 1.

If no function associated with the active action exists or if the functions associated with the active action have been successfully executed, the CSE executes any propagation expression associated with the object and continues processing by determining if any object type flag is primitive or atomic. If not, the CSE goes to state 3 to select the next action. If yes, then the CSE determines whether the current action has an update instant or delete instant (instant propagation type action control) flag. If an update instant flag exists, active instants are updated or an empty instant is added to the database. If a delete instant flag exists, the CSE deletes an active instant and ignores empty instants. If an object has link objects, its associated link propagation expressions are executed and its instants are updated. If user selects NEXT or PREVIOUS event, the CSE obtains the NEXT or PREVIOUS instant. If user selects a PROCESS event, the CSE returns to state 3. If an error occurs during any of these activities, the CSE returns to state 3 with an event flag indicating a failure. As in State 4, for each action a test is performed by the EBCS to conform or enforce the expected behavior of the processing actions.

In State 5, the active model is terminated and the CSE activates the most recently suspended model if one exists and goes to the next state of the activated model; otherwise CSE returns to State 2.

In State 6, the CSE is terminated. Once the CSE is initialized it executes through its various states until State 6 is reached. As the CSE executes, the functionality defined in the information model is effected in the same way as a prior art source code program executes.

An application processing system such as MICS is greatly enhanced by the inclusion of an expected behavior control system (EBCS) for automatically enforcing, detecting and correcting the behavior of the actions implemented by the application programs. This allows the expected behavior to be modified without effecting the operation of the application processing system. An EBCS may operate in one of two methods. In the first method the EBCS conforms the behavior of the system to an expected behavior of the system defined by the EBCS. In the second method, a particular behavior can be enforced by the EBCS to alter the behavior of the application processing system in a desired manner along with the conformance of behavior.

Figure 5:
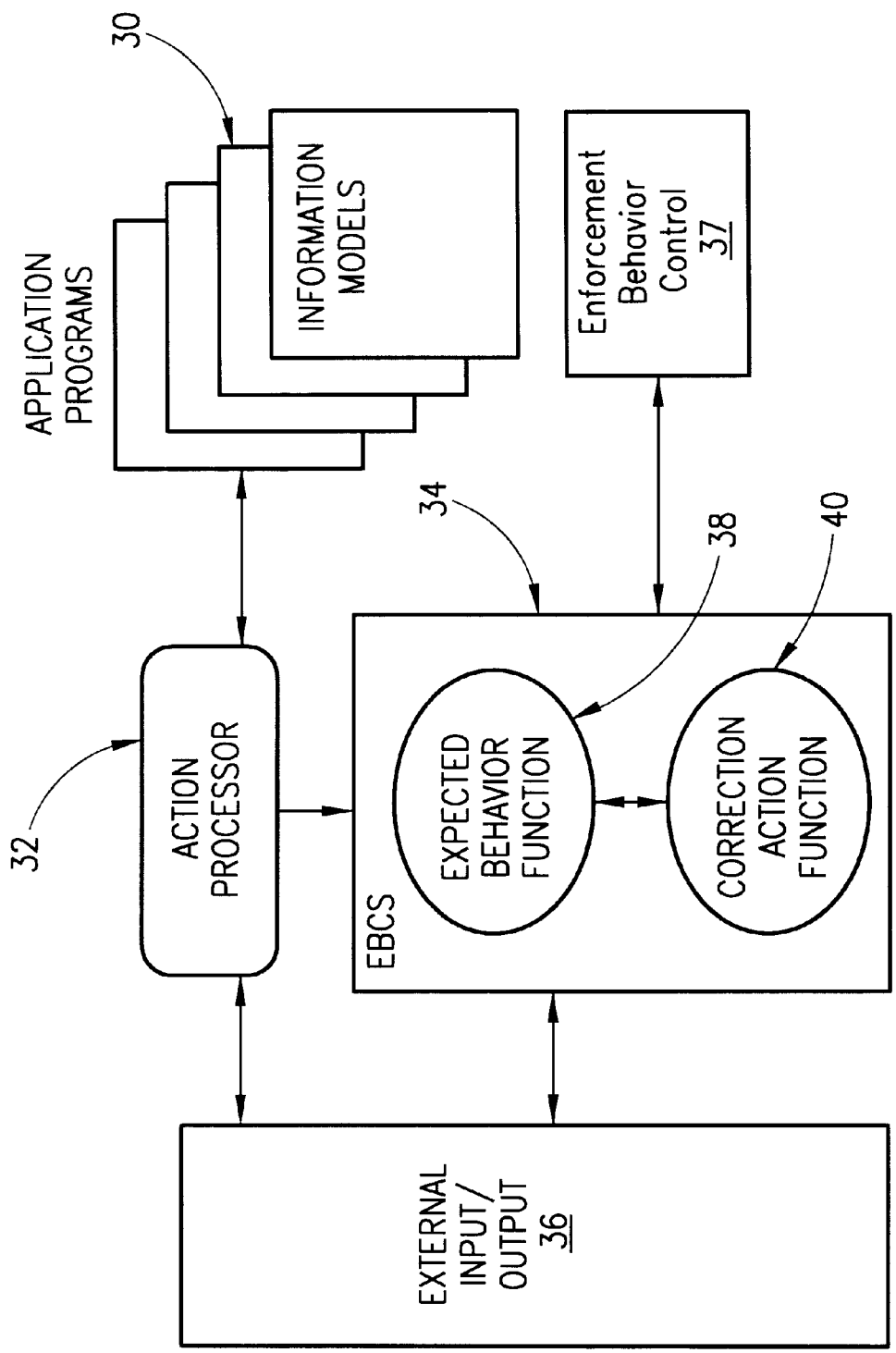
FIG. 5 illustrates an application processing system including an expected behavior control system.

Referring now to FIG. 5, an application processing system 30 is illustrated including an expected behavior control system 34. The application processing system 30 consists of an action processor 32 for executing application programs by executing one or more actions required by an application program. The execution of these actions generates a particular behavior. With respect to MICS, the action processor will comprise the control system engine and the application programs will consist of information models.

An EBCS 34 interfaces with the action processor 32 and an external input/output 36. In most cases, the EBCS 34 executes after each execution of an application "action" which occurs during active instants (State 3) and process instants (State 4) of an application processing system 32 such as the MICS. However in some cases, execution of the EBCS 34 may occur before the execution of an action or expression to check for certain conditions affecting enforcement of a particular behavior. With respect to the ECBS 34 the terms "rules", "expressions", "functions" and "actions" are synonymous unless otherwise specified.

The EBCS 34 comprises an expected behavior function (EBF) 38 for conforming and/or enforcing processing system behavior to expected behavior rules in response to the resulting behavior of an action initiated by the application program and a correction action function 40 for executing one or more corrective actions to conform or enforce the expected behavior function 38 and correction action function 40 may be incorporated as separate rules or as a single rule without effecting the overall operation of the present invention.

The expected behavior function 38 consists of a set of rules for determining whether or not an expected behavior for an executed application program action has occurred. This rule may either conform the behavior of the system to an expected behavior and/or enforce the new behavior of the actions by selecting and executing one action to another action using EBCST 37 in a desired manner. If the conditions set by the rules within the EBF 38 are not met, a correction ID number is returned which the correction action function 40 uses to enable an associated response for executing actions to achieve the expected behavior for the application processing system.

The expected behavior rules of the EBF 38 verify specific behavior for actions initiated by the application programs and implement corrective actions for conforming or enforcing the expected behavior of the system when necessary. The enforcement behavior actions are defined in the enforcement behavior control table 37 organized by actions. Here "actions" means activation, constraints, select, propagation associated with an object/attribute of the application, or new actions used as functions such as displaying document or any special purpose functions. The expected behavior rules are divided into two groups, missing action rules and invalid action rules. The missing action rules search for specific behavior which should result in response to a particular action. The invalid action rules detect and correct behavior occurring which should not be occurring. A sample of these rules for conforming system behavior are as follows:

Missing Action Rules

1. If missing index key attribute value then execute action "correct specification to assign index key attribute value."

2. If instant contains cross reference and no cross reference is added to the database then execute action "correct specification to create cross reference."

Invalid Action Rules

1. If user instant and no attribute value change by the user and database update occurs the execute action "correct invalid propagation expression."

2. If loop condition in assignment of attribute values then execute action "terminate assignment loop condition."

The above described rules are not meant to be limiting, and any number of rules for conforming and correcting the expected behavior of the system may be used.

The following example is an application program corresponding to an information model of the MICS system described previously. This information model will be used to demonstrate the EBCS and its functionality.

---

MODEL PAYMENT MANAGER

OBJECT BANK ACCOUNT,ADD,UPDATE,REPORT,JOURNAL
ACT ID,UNIQUE,FPROT
NAME
ACCOUNT NO
BALANCE
OBJECT TRANSACTION,ADD,UPDATE,REPORT,JOURNAL
    propagation
        ([ACT ID] IS " ") [PAYEE] = [NAME].
CODE
    propagation
        ([CODE] IS "ICR") [REFERENCE] = 999999.
DATE
PAYEE
AMOUNT
    propagation
        ([AMOUNT<0) [REFERENCE] = 999999.
REFERENCE
    propagation
        ([REFERENCE] IS "999999") [AMOUNT] -=[AMOUNT]
ACT ID
    propagation
    [PAYEE] = [NAME].
STATUS
TRANSACTION JOURNAL,JOURNAL OF TRANSACTION,HIDE
        ([AMOUNT] is not "0") [CTYPE] = [CODE].
CTYPE
PAYEE
DATE
AMOUNT
ACT ID
BALANCE CHECKBOOK, VIEW OF TRANSACTION,BROWSE,REPORT
    select,ALL -continued

MODEL PAYMENT MANAGER ([STATUS] is "0").
    activation
      ([LAST BALANCE] IS ZERO) [LAST BALANCE] = [BALANCE];
    [LAST BALANCE] -= [AMOUNT].
    propagation
    [BALANCE] -= [AMOUNT].
CODE,ENTRY=15
PAYEE
DATE
AMOUNT
LAST BALANCE,ENTRY=1
INDEX TRANSACTION,ACT ID The following description illustrates a number of cases wherein the trace for the operation of the EBCS to conform expected behavior can be seen:

Case 1: Assume a user has selected the ADD action of the BANK ACCOUNT object. In execution of State 6 by the CSE, the database operation fails because ACT ID index key attribute value is indexed but the value assignment for ACT ID never occurs because the field is protected from data entry by the FPROT attribute flag and there is no propagation expression or "action" to assign to the attribute value. Upon execution of the EBCS, conformance with the EBCS missing action rule 1 is not achieved, and the correction action function executes "correct specification to assign index key attribute value." Here EBCS correction actions of the correction action function can automatically remove the FPROT attribute flag from ACT ID attribute definition of BANK ACCOUNT to correct the problem without having the user modify the information model, or EBCS correction actions can interact with the user through the input/output interface by displaying the attribute definition and asking the user to change the flag or add a propagation expression to correct the problem to enforce the expected behavior.

Case 2: In the TRANSACTION object, the JOURNAL flag instructs the CSE to activate the journal object of TRANSACTION after a database operation. Assume the user has selected the ADD action of TRANSACTION. If the AMOUNT attribute value is not entered by the user, then the CSE fails to create the journal database record because upon execution of the journal object, no attribute value is changed because the propagation expression only changes attribute values if AMOUNT is not zero. EBCS conformance missing action rule number 2 is not achieved, and the correction action function executes "correct specification to create cross reference." The correction action can enforce the behavior by automatically adding the MUST FILL flag to the attribute definition AMOUNT of TRANSACTION or EBCS correction actions can interact with the user using input/output interface to ask the user to change the MUST FILL flag or modify the propagation expression of the journal object to change at lease one attribute value.

Case 3: Assume that the user has selected the ADD action and the user enters a CODE value equal to ICR. The REFERENCE value then changes to 999999. This causes the AMOUNT value to become negative, which in turn causes the REFERENCE value to change to 999999. This creates a loop condition and conformance with the EBCS invalid rule 2 fails, and the EBCS executes "terminate loop condition". The correction action function can conform the behavior by automatically terminating the loop condition or asking the user to do so via the input/output interface.

It is important to note that there is no fault in any processing portion of the information model itself. The fault is in the information model specification. In a traditional software program, the error would be in the program specifications and the process flow and not in the actions executed in response to the program.

In addition to conforming the application processing system to a specific behavior, the EBCS may also enforce new behavior of actions defined by the APCS under enforcement behavior control table 37 and by executing one or more actions over another action. This enables the application processing system to operate in a new manner without altering the databases or application programs as they exist. One example of this enforcement of behavior would be a method for enabling two users to update a database record at the same time as long as the users were working on different attributes of the record. Currently existing systems do not enable two users to update the same database records concurrently.

Presently when an application requests use of a database record for updating purposes, the application initiates a READ UPDATE action that reads the entry within the database and locks the record into an UPDATE mode. During the READ UPDATE action, no other user may access the database record. This is due to the fact that the READ UPDATE action initiated by the application program enables only one user to access the desired database. A new type of behavior may be enforced by the EBCS by using a set of enforcement rules similar to the conformance rules discussed previously. The enforcement rules are different from the conformance rules in that they may be executed both before and after the execution of an action. This is due to the fact that the expected behavior for the action may be different depending upon the existing conditions.

Assume the following rules are also included within the EBCS 34:

1. If action is READ UPDATE, then get record with READ without UPDATE and activate the instant.

2. If action is READ UPDATE, then wait until record is available for READ UPDATE and update database record with attribute values of the instants which have been changed by the user interface or propagation expression.

Thus, when a READ UPDATE action is executed by the application processing system the EBCS rule 1 causes the record to be read without update. This enables more than one user on the network or client/server computing system to simultaneously update the same record without locking up the record during an update session. Upon completion of each user's modifications to a record, each user's updates are returned to the database in accordance with rule 2. Rule number 1 is a pre-enforcement rule executed before execution of an action to direct the processing in a desired direction without altering the application programs. In this case, the rule initiates only a READ action. Rule number 2 is a post-enforcement rule for enforcing a particular behavior after execution of an action. In this case, the rule reads the database record for UPDATE READ and modifies the record with the changes made by the user.

Rules such as this enable multiple users to update a database record as long as different attributes of the database record are being updated. In a normal processing system, whatever changes are last made to the attribute value of a record are the changes that are finally used within the database record. Should a conflict occur between multiple users trying to update the same attribute during READ UPDATE actions, additional rules may be included in the EBCS 34 to enable resolution of the conflict. A rule may be included in the EBCS 34 enforcing that whichever user has entered the largest number of attribute value changes within a specific group gets priority for all attribute value changes for the group. Thus, in the case where a first user updates one attribute in the record of a first patient and five attributes within the record of a second patient, and a second user only updates ten attributes within a record of the second patient, the corrective actions force the changes made by the first user to control and be entered into the first patient's record, and the attributes entered by the second user to control and entered into the second patient's record.

It should be noted from the foregoing discussion that none of the application programs are being altered in any way. All that is altered is the manner in which the actions of the information model are carried out to enable new system behaviors to be achieved without reprogramming the application programs. It should also be noted that the particular rules discussed for enforcing behavior are merely illustrative and that any number of rules may be used to achieve any desired behavior.

Referring now back to FIG. 3, the Application Processing Control System 13 (APCS) receives several types of input and processes these inputs as follows:

1. If the input is a query 95 for the current application through external user interface 90, APCS 13 selects the specified object, action and information selection directives 120 and application processing continues under CSE 14. In a specific example where the APCS 13 is running the Contact Manager information model, a user enters the query "Update contact data of John Doe." The APCS 13 selects contact data and an action update and selects the contact data record of John Doe. Processing proceeds to state 4 of the CSE.

2. If the input is a query for another application, APCS 13 loads another application 130, sets its target mode if one exists, selects the objects or actions necessary for the query 95 and processes the query under the CSE 14. In a specific example where a user types in the query "switch to word processor and update the Appage™ page "word.veb"", APCS 13 switches to the Word Processor application, selects action update and loads the Appage™ page for the document "word.veb" into the word processor attribute window. Then, APCS 13 goes to state 4 of the CSE and continues processing.

3. If input is model I/O 96 through external user interface 90 for an information model 12, the CSE 14 applies internal control (of state 2,3 or 4) to the current information model and continues processing. In a specific example, all user inputs (e.g., data or control, Cancel, Process, etc.) are processed by the CSE 14 for the currently running information model 12.

4. If input is model I/O 96 for a new application with a target mode, APCS 13 starts the new target application by loading the information model associated with the target application and selecting an object and action associated with the query. It also sets appropriate state for CSE 14 based on the directive provided in query. Processing continues under the CSE 14, which executes the target information model with a plurality of actions and control directives under the EBCS 34.

Below is an example where behavior is changed with a new action without modifying the information model of the target application.

| Information Model for stock table |
|---|
| #Model, Stock Table, Table, Update |
| Stock Symbol, TYPE=c, Len=8 |
| Company, Len=30 |
| Date, Type=d |
| Price, Type=r |

The information model "stock table" consists of a database with four attributes Stock Symbol, Company, Date and Price along with two actions Add and Update. When user wants to update stock prices, user selects update action and manually updates stock prices in the stock table. Now, instead of manually updating the stock prices, user wants automatically updated stock prices via Internet whenever user selects update stock prices in the table. In this case, user must rewrite the information model. However, in this invention, a user can achieve the updates of stock prices without modifying the information model. The enforcement behavior table 3 in this case would appear as follows:

| Model | Action | Enforcement of Behavior Action |
|---|---|---|
| Stock prices | Activation | Post Transaction with Stock Symbol, Get Reply From Host, Extract prices from the Reply, Update Prices in the Stock table |

The enforcement behavior action for the Stock Table is executed before the Activation action to achieve the new behavior. The enforcement action may be executed in conjunction with, or in lieu of, the action defined by the information module. The EBCS may then confirm the desired behavior has been enforced.

The following is an example of a target application processing system whose behavior is modified without modifying the target application processing system where the target application processing system is used as an action of an another target application processing system. In this example APCS 13 uses the Microsoft Internet Browser as an external action to load and display an HTML document using an OLE interface. The APCS 13 intercepts the document or any portion of the browser document and executes action "Load" using an APCS function. Upon receipt of the document APCS 13 executes a "filter" enforcement action that removes any unwanted script (e.g. Java script or VB script ) which can infect the computer with a virus by discarding all portions of this data embedded in the comments. If a document contains any phrases that represent sex or nudity or any other offensive or undesired material, the filter action displays an error message and discards the document.

Enforcement of behavior may be used to entertain a user while a target document is loaded by providing some useful information related to the current document such as an advertisement or copyright notice, etc. The rules for these behaviors are located within the enforcement behavior table 3 and would be activated by a downloading or similar command from the browser. Thus, APCS 13 enforces multiple new behaviors to the target action Internet Browser without modifying the target action Internet Browser.

The information model for a "Browser" target application and a Document load function is as follows:

---

Model, Browser, VIEW

Initial Value
    Set URL to www.joe.com
    Select
    Load document associated with URL from host associated with URL
    Activation
    If Load Images flags is set also load associated images
URL,TYPE=c, LEN=80
    Propagation
    Set Event to Next Event
    Document, TYPE-D, PTYPE=HTML Document
    Propagation
    Set selected next hyperlink to URL

---

Since there is only one function VIEW, the CSE sets function to VIEW and goes to state 3. In state 3, the CSE executes any initial value action. In this case the initial value action sets URL to www.joe.com and instantiates instants using the Select action. CSE then executes activation actions if any. Next, the CSE loads images associated with the document and goes to state 4. In state 4, since the Document type is HTML CSE displays HTML Document using COM Interface and WEB Browser control. Here the WEB Browser is the target application. CSE displays documents using an HTML document presentation service. The CSE continues processing until the user cancels or selects another model.

In the above example when a user enters a URL address or a name of an HTML document or www site, a propagation expression is executed which sets next EVENT equal to NEXT. The CSE continues select and activation actions and so forth.

In the above example, we can enforce a new behavior "filter" document by executing the "activation" and "filter" expected behavior actions but without modifying the original information model or WEB Browser target application processing system. In this case, when the EBCS checks if any expected behavior action is associated with the "activation" action, it finds the "filter" action, In response thereto, the EBCS executes the "filter" action such that the document is filtered, for undesired or offensive material by deleting all or a portion of the downloading document. The CSE then return to state 4 and continues as described above. Filter is an independent action and its execution has no impact to information Model or target application. In the existing systems this feature can be only added by modifying the application itself.

The table below illustrates different combinations of transaction processing enforcement behavior actions that can be implemented with zero impact to the original information model and target application behavior table 3 in this case would appear as follows:

| Model | Action | Enforcement of Behavior Action |
| --- | --- | --- |
| Browser | Activation | Filter nudity language, activation |
| Browser | Propagation | Print coupon if advertisment, propagation |

An exemplary implementation of the information model of providing the behavior of target application processing system using an another target application processing system as an action will be illustrated. In this example APCS 13 provides the behavior of Internet Browser and the Internet Browser with Filter target applications using the target Word Processor action and its associated information model.

Below is the Word Processor target application processing system using Document Information Model and the external action Word Processor. Here Document is added, viewed or updated using document attribute window, that is

---

Model Document, Target= Word Processor, Browser, Browser with Filter
    Initial Values
    If no Target then target is Word Processor
    If Target is Word Processor then operation is ADD UPDATE else
operation is Browse
    File, TYPE=c, Len=64
    Document, TYPE=c, PTYPE=Word Processor

--- document attribute window is created using external action word processor via COM or similar interface. APCS 13 intercepts all commands for load or save document from the external action Word Processor via COM interface. APCS 13 provides behavior of Browser and Browser with Filter by changing the behavior of these actions.

In the Target Control directive of Document information model contains three target modes Word Processor, Browser and Browser with Filter. Whenever, Document information model is started by APCS 13, target control mode is set to Word Processor via initial values control directive. The document information model can also be started with one of the target applications (e.g., Browser) using the menu bar, query command, icons, etc. In this example, since the Word Processor operation is ADD UPDATE and no document is yet selected, APCS 13 sets the data mode to ADD, and goes to state 3 of CSE and continues processing. Upon entering some text, if the user selects a save operation, the APCS 13 saves the document using Document target expected behavior control. If document target control is a Word Processor, then the document is saved in a Word Processor format. If the document target control is Browser, then the document is converted and saved in an HTML format, etc.

The difference between one or more target applications, i.e., Word Processor, Browser and Browser with Filter, is eliminated by means of a plurality of actions and target control directives controlling actions of the target application. Note that the neither target action has to be changed or Browser and Browser Filter target applications does not exist but target application behavior is achieved via changing the behavior of load and save document commands. By allowing the selection of multiple target control directives, the target application can be implemented by identifying and providing plurality of actions using a single information model. When the documents are stored on the DBMS (instead of files), then the model control directive allows multiple users to update a single document using conflict resolution. Also, changes can be replicated using the same conflict resolution in batch mode, thus enforcing the behavior of the Groupware target application program application without requiring Groupware. This example shows that the APCS 13 can execute multiple target applications 12 using a single information model processing system by merely executing a plurality of actions and control directives consisting of one or more flags.

The use of the APCS 13 can be extended such that one or more target applications can be executed through just a single real time application. This can be accomplished by using target control and action as shown below.

| Target Application | Information Model | Enforcement Behavior Mode | Action | Enforcement Behavior Actions |
|---|---|---|---|---|
| Browser | Word Processor | Browsing | Load Instant | Load HTML file, convet to word processor file, load instant |
| Browser | Word Processor | Browsing with filter | Load Instant | Print coupon if advertisement of document, load target HTML file, filter language for nudity related words, convert to word processor file, load instant |

Changing the Behavior of Target Application System via Natural Language like Ouery System One of the objectives of the invention is to use natural language-like input to access and process the information in real time. The APCS accomplishes this task by changing the behavior of the select and activation instants of the target application without modifying the information model of the target application. To use the Query option, a user selects "Query" from the Menu Bar. The Query screen appears. The user enters Query (see below) and hits F10 or selects "Process". The user can cancel the Query command by selecting "Cancel" or hitting ESC. Query 95 (FIG. 3) in APCS has predetermined words and specific syntax to expedite the processing and complete the Query command quickly. By doing this, it avoids the complexity of searching the words, understanding the grammar and linguistics some other applications have implemented to perform the natural language like query.

A further enhancement of the control system is a voice interface query function such as the Appage™ Query, which is designed for voice interface in addition to keyboard and mouse interface. When a voice interface is available on user's computer system, it can also be used to access and/or process specific information from or within any application using commands that adhere to natural language. In case of a voice interface, the user activates "Query" with a query command, verbalizes their query and completes the instructions with a process command.

In the Payment Manager Information Model, since there are more than one objects the APCS 13 displays a list of objects to the user, and the user selects the object. Similarly, if the user can use more than one functions to activate and process instant of the selected object the APCS 13 displays set of functions, and the user selects the function. APCS 13 sets State to 3, and the CSE 14 continues execution until the user processes an instant for the object. Suppose the user wants to automatically select an object transaction and function update when the user starts the Payment Manager. Generally, the user has to modify and add initial action "update the transaction manager". However, if the user wants to go to any object, function or modify temporarily the behavior of the information model without using EBCS, the user can use the Query Interface. The Query Interface modifies the behavior by executing query 95 and the Query Engine 100 to temporarily select object, function and any expression such as select condition, activation or propagation of the specific object or model. Thus allowing a change in the behavior of application processing system without the use of EBCS. As opposed to EBCS, Query only changes the behavior of the object or model until user stops or completes processing instances of that model. Typical Query example to enforce a new behavior is as follows:

SWITCH TO PAYMENT MANAGER AND
UPDATE THE TRANSACTION WHERE AMOUNT > 2000
AND PROPAGATE AMOUNT = 2000

Here, the first part selects/switches/activates the new information model, the second part selects object "transaction" and operation/action "update", the third part is a new select condition that replaces the old select condition (in this case there is none), and the fourth part changes the behavior of processing by replacing the old propagation with this new propagation.

Measure of Impact via Expected Behavior of Actions

Highly complex information processing systems have many components for processing and providing information/data to each other and interacting with each other in a complex manner. Generally, these components are tightly coupled and their interaction may have several closed loops making it difficult to understand the interaction. Performance of the entire system is dependent on the expected behavior of each component at every step. It is practically impossible to measure the interaction of different components in such a complex information processing system. When input data changes the expected behavior of a component, its effect on the behavior of the entire system, typically known as the impact, is highly dependent on the interaction of different components. Measuring the impact and performing the impact analysis when several inputs are changing simultaneously has become a difficult and resource intensive task. In order to perform such a task, an impact of each component has to be measured.

Figure 6:
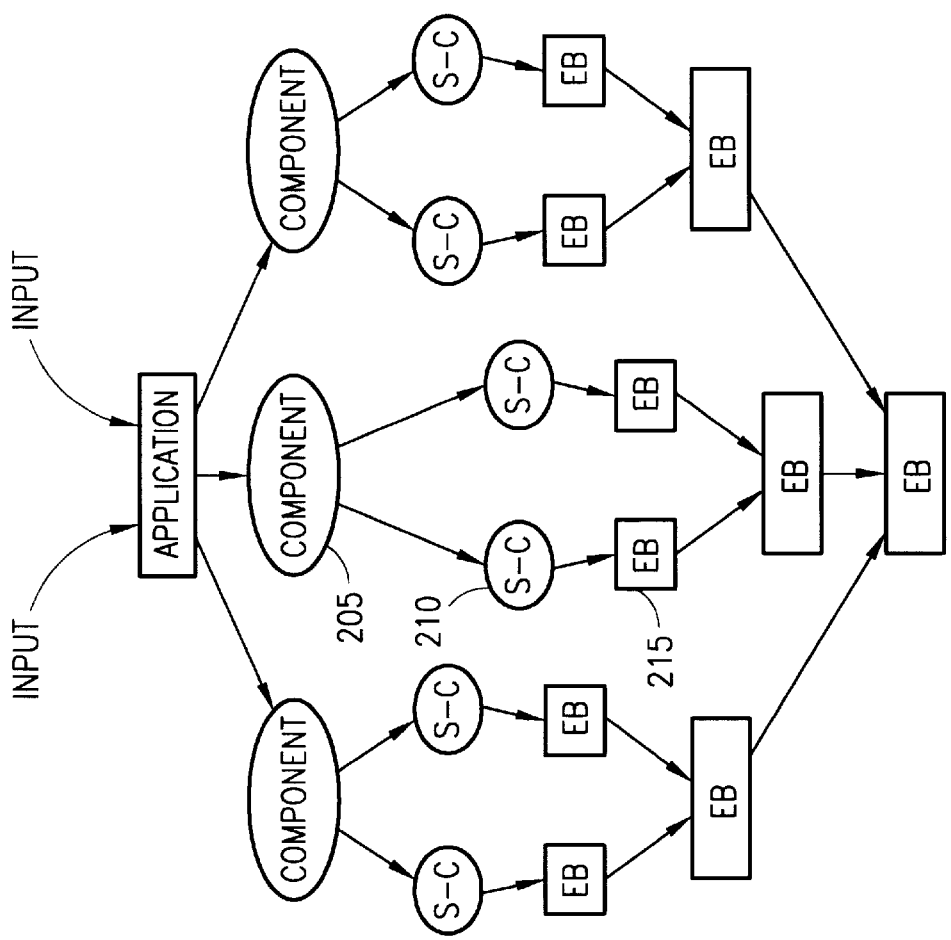
FIG. 6 illustrates a manner for using expected behavior for controlling applications with varying inputs.

The objective, as shown in FIG. 6, is to structure an application 200 into components 205 so as to separate the impact of each component and to ensure that the components changed by the user has zero or minimal impact on the application as a whole. The components 205 are further separated into sub-components 210 which are actions of the component so that the impact is dependent on the sub-components and is measurable using the expected behavior 215 of the sub-components. Thus, an expected behavior 215 is attached to each sub-component 210. If a component 205 performs according to its expected behavior with the changes into inputs or changes into its sub-components (actions) then the components have no effect on the behavior 215 of the entire application. This allows a change in individual sub-components independent of the entire component thus resulting in zero or minimal impact. Let us consider a task in a complex application that has an action with an expected behavior. In order to ensure that this action has no impact on the application 200, one must continuously monitor its behavior to check that the action conforms to its expected behavior. The difference between the expected and actual behavior provides a parameter (EB) to measure the impact of that component 205. For example, the occurrence of the year 2000 may have an impact on the application 200. To measure the impact on the application 200, the APCS 13 performs the action with this new input or executes a new action and generates the new expected behavior EB' of the component. That new action's behavior EB' must match the original expected behavior EB at the component level. Then the impact of this new data is the difference D between the original expected behavior EB and the new expected behavior EB'. The total impact of entire application processing system is F=function (D1, D2, . . . ).

The impact on all components (of the application process) is unknown because the function is unknown.

In order to eliminate the impact of the new environment, APCS 13 must create an additional new action such that when combined with the expected behavior of the new action it matches the expected behavior of the old action. Thus D approaches zero as the expected behavior of the new action matches the expected behavior of the old action, resulting in zero or minimal impact. Separating processing from applications and using controls and directives (which we refer to as actions) not only allows users/developers to separate the impact from the application at the action level but also allows actions to subsume multiple applications into a single application thus minimizing the overall impact on applications.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A system for controlling behavior of a plurality of target applications, comprising:
    an information model defining a single process flow and including a plurality of actions having a first expected behavior associated therewith, the information model executable in a process flow control engine;
    a rules database including a plurality of rules, each rule uniquely associated with one of the plurality of actions of the information model and defining a second expected behavior for the associated action in accordance with the single process flow, the plurality of rules grouped into a plurality of rules sets wherein each rule set is associated with one the plurality of target applications; and
    means for selecting between the plurality of rule sets to enable the information model to perform the single process flow in accordance with the behavior of one of the plurality of target applications associated with a selected rule set.

2. The system of claim 1 wherein the rules of the rules database comprise control flags indicating an expected result.

3. An apparatus for enforcing multiple target application processing behaviors using a single target application processing system, comprising:
    an information model for defining a single process flow of the target application processing system and at least one action of the target application processing system;
    means for defining at least one behavior and an action associated with the at least one action of the target application processing system for each of the plurality of target applications;
    means for selecting the at least one behavior and action associated with a particular target application to enforce an associated behavior for the target application processing system; and
    a process flow control engine for executing the information model, without code generation normally associated with software application programs, in accordance with the selected at least one behavior and action associated with the at least one action of the target application processing system.

4. An apparatus for changing a behavior of a target application processing system without modifying the target application processing system, comprising:
    an information model for defining a single process flow of the target application processing system and at least one action of the target application processing system;
    means for defining at least one selected behavior and an action associated with the at least one action of the target application processing system;
    means for selecting the at least one behavior and the action associated with the at least one action of the target application processing system; and
    a process flow control engine for executing the information model, without code generation normally associated with software application programs, in accordance with the selected at least one behavior and action associated with the at least one action of the target application processing system without modifying the at least one information model.

5. The apparatus of claim 4 wherein the means for selecting enables selection of a number of behaviors.

6. The apparatus of claim 4 wherein the actions comprise a null action with the associated behavior nullifying the behavior of the at least one action defined by the information model.

7. The apparatus of claim 4 wherein the target application comprises a word processor, the means for defining defines the actions "load word processor document" and "load Internet document" and the associated behaviors are "performing as a word processor" and "performing as an Internet browser", respectively.

8. The apparatus of claim 4 further including means for confirming the selected behavior has been enforced.

9. A method for changing a behavior of a target application processing system without modifying the target application processing system, comprising the steps of:
    defining the target application processing system using an information model that defines a single process flow of the target application processing system and at least one action of the target application processing system;
    defining at least one behavior and an action associated with the at least one action of the target application processing system;
    selecting the at least one behavior and the action associated with the at least one action of the target application processing system; and executing the information model, without code generation normally associated with software application programs, in accordance with the selected at least one behavior and action associated with the at least one action of the target application processing system.

10. The method of claim 9 wherein the step of executing further comprises the step of executing the associated action in lieu of the at least one action defined by the information model to enforce the selected behavior.

11. The method of claim 9 wherein the step of executing further includes the step of executing the associated action in conjunction with the at least one action defined by the at least one information model to enforce the selected behavior.

12. The method of claim 9 wherein the step of selecting further includes the step of selecting a plurality of behaviors and their associated actions.

13. The method of claim 9 wherein the step of selecting further includes the step of selecting a behavior associated with a second information model.

14. The method of claim 9 further including the step of confirming that the selected behavior has been enforced.

15. The method of claim 9 further comprising the steps of:
receiving an input to the target application processing system;
executing a behavior action in response to the received input to generate a particular result of the behavior action;
determining a difference between the particular result of the behavior action and the expected result of the behavior action; and
monitoring the difference to determine if the input has an effect on the result of the behavior action.

16. The method of claim 15 further including the step of creating a new behavior action such that execution of the new behavior action causes the particular result of the behavior action to match the expected result of the behavior action.

17. The method of claim 16 further including the step of repeating the step of creating upon detection of a difference between the particular result and the expected result of the behavior action.

18. The method of claim 9 wherein the step of executing further comprises the step of:
activating the at least one action such that execution of the at least one action initiates execution of the at least one behavior;
executing the at least one action; and
executing the at least one behavior responsive to execution of the at least one action.

19. The method of claim 18 wherein the target application comprises an Internet browser and the at least one action comprises downloading a document from the Internet.

20. The method of claim 18 wherein the at least one behavior action comprises filtering selected data from the downloaded document from the Internet.

21. The method of claim 18 wherein the at least one behavior action comprising displaying other data during downloading of the document from the Internet.

22. A system for controlling the behavior of a plurality of target applications wherein each target application has an independently defined behavior, comprising:

an information model for defining a single process flow of the target application processing system for executing a plurality of target applications and at least one action of the target application processing system;

means for defining, for each of the plurality of target applications, at least one behavior and an action associated with the at least one action of the target application processing system, the at least one behavior and action associated with the target applications in groups; and means for selecting one of the groups associated with a target application;

a process flow control engine for executing the information model, without code generation normally associated with software application programs, in accordance with the at least one behavior and action of the selected group.

23. The system of claim 22 wherein the means for selecting further selects a plurality of behaviors and their associated actions.

24. The system of claim 22 wherein one of the target applications comprises for a word processor, the at least one action comprises a load document action and the selected behavior associated with the at least one action comprises loading an Internet document.

25. The system of claim 22 wherein one of the target applications comprises a word processor, the at least one action comprises a load document action and the selected behavior associated with the at least one action comprises filtering an Internet document.

26. The system of claim 22 wherein the process flow control engine may execute the at least one action of the selected group in lieu of the at least one action of the information model.

27. The system of claim 22 wherein the process flow control engine may execute the at least one action of the selected group in conjunction with the at least one action of the information model.

28. A method for altering a behavior of an information model by changing one or more actions of the information model, comprising:
defining an information model that describes a single process flow and includes at least one action;
defining a plurality of actions, each of the actions having an associated expected behavior;
selecting an action from the list of actions; substituting the selected action into the information model for the at least one action defined by the information model; and
completing the behavior associated with the substitute selected action for the single process flow of the information model.

29. The method of claim 28 wherein the action comprises a select operation of APCS.

30. The method of claim 28 wherein the action comprises a select condition of an activation of an instant.

31. The method of claim 28 wherein the action comprises a select condition of a propagation of an instant.

* * * * *